(12) United States Patent
Lackey (10) Patent No.: US 9,151,078 B2
(45) Date of Patent: Oct. 6, 2015

(54) TRUCK BOX WITH KEYLESS ENTRY SYSTEM

(71) Applicant: John S. Lackey, Navarre, FL (US)

(72) Inventor: John S. Lackey, Navarre, FL (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 57 days.

(21) Appl. No.: 13/967,900

(22) Filed: Aug. 15, 2013

(65) Prior Publication Data

US 2015/0047397 A1 Feb. 19, 2015

(51) Int. Cl.
*E05B 47/00* (2006.01)
*B60R 9/06* (2006.01)
*E05B 63/14* (2006.01)
*E05B 53/00* (2006.01)
*E05B 65/52* (2006.01)

(52) U.S. Cl.
CPC .............. *E05B 47/00* (2013.01); *B60R 9/065* (2013.01); *E05B 63/143* (2013.01); *E05B 53/003* (2013.01); *E05B 65/5253* (2013.01); *E05B 2047/0084* (2013.01); *Y10T 70/5058* (2015.04)

(58) Field of Classification Search
CPC .................... E05B 65/5253; E05B 2047/0084; E05B 65/00; E05B 53/003; E05B 63/143; E05B 47/00; Y10T 70/5058; B60R 9/065
USPC .......... 70/63, 158–159, 257, 275, 277, 278.1, 70/278.7, 280, 279.1, 69
See application file for complete search history.

(56) References Cited

U.S. PATENT DOCUMENTS

| | | | |
|---|---|---|---|
| 3,192,448 A | 6/1965 | Hevenor | |
| 3,662,226 A | 5/1972 | Tonkowich et al. | |
| 3,831,408 A | 8/1974 | Featherman | |
| 4,083,424 A | 4/1978 | von den Stemmen et al. | |
| 4,150,731 A | 4/1979 | Tannenbaum | |
| 4,161,870 A | 7/1979 | Barnes | |
| 4,206,491 A | 6/1980 | Ligman et al. | |
| 4,486,806 A | 12/1984 | Mochida et al. | |
| 4,495,540 A | 1/1985 | Remington et al. | |
| 4,684,945 A | 8/1987 | Sanderford, Jr. | |
| 4,742,327 A | 5/1988 | Burgess et al. | |
| 4,866,963 A | 9/1989 | Leininger et al. | |
| 4,998,425 A | 3/1991 | Hoogland | |
| 5,042,853 A * | 8/1991 | Gleason et al. | 292/126 |
| 5,117,665 A * | 6/1992 | Swan et al. | 70/264 |
| 5,123,691 A | 6/1992 | Ginn | |
| 5,278,547 A | 1/1994 | Suman et al. | |
| 5,308,126 A * | 5/1994 | Weger et al. | 292/53 |
| 5,351,512 A * | 10/1994 | Pearlman | 70/257 |
| 5,484,092 A * | 1/1996 | Cheney | 224/404 |
| 5,531,086 A * | 7/1996 | Bryant | 70/279.1 |
| 5,532,521 A | 7/1996 | Leininger | |
| 5,601,206 A | 2/1997 | Haas et al. | |
| 5,686,899 A | 11/1997 | Hosmer | |
| 5,727,835 A * | 3/1998 | Krush et al. | 296/37.6 |
| 5,755,126 A | 5/1998 | Lanigan et al. | |
| 5,774,059 A | 6/1998 | Henry et al. | |
| 5,778,805 A | 7/1998 | Green | |
| 5,781,399 A | 7/1998 | Lanigan et al. | |
| 5,816,630 A * | 10/1998 | Bennett et al. | 292/341.17 |

(Continued)

*Primary Examiner* — Lloyd Gall
*Assistant Examiner* — Amanda L Miller
(74) *Attorney, Agent, or Firm* — GrayRobinson, PA (57) ABSTRACT

A truck box is provided having latch elements, one or more locking mechanisms and a keyless entry system which is operative independently of the locking mechanisms to move the latch elements to an unlatched position in order to permit opening of the lid of the truck box.

8 Claims, 7 Drawing Sheets

(56) References Cited

U.S. PATENT DOCUMENTS

| | | | |
|---|---|---|---|
| 5,873,276 A | 2/1999 | Dawson et al. | |
| 5,875,948 A * | 3/1999 | Sadler | 224/404 |
| 5,881,584 A * | 3/1999 | Brunoski et al. | 70/68 |
| 5,952,731 A | 9/1999 | McPherson et al. | |
| 6,049,448 A | 4/2000 | Lanigan et al. | |
| 6,092,404 A | 7/2000 | Chhatwal | |
| 6,130,621 A | 10/2000 | Weiss | |
| 6,164,219 A | 12/2000 | Green | |
| 6,349,577 B1 * | 2/2002 | Hansen et al. | 70/159 |
| 6,359,547 B1 | 3/2002 | Denison et al. | |
| 6,378,344 B1 | 4/2002 | Gartner | |
| 6,409,064 B1 | 6/2002 | Bayley | |
| 6,454,320 B1 * | 9/2002 | Weinerman et al. | 292/56 |
| 6,543,821 B1 * | 4/2003 | Weinerman et al. | 292/123 |
| D486,376 S | 2/2004 | Magner et al. | |
| 6,755,449 B2 * | 6/2004 | Weinerman et al. | 292/198 |
| 6,772,613 B2 * | 8/2004 | Webb et al. | 70/159 |
| 6,854,870 B2 | 2/2005 | Huizenga | |
| 6,857,298 B2 * | 2/2005 | Linares | 70/159 |
| 6,959,846 B2 * | 11/2005 | Schomaker et al. | 224/404 |
| 7,019,615 B2 | 3/2006 | Denison et al. | |
| 7,040,675 B1 | 5/2006 | Ott et al. | |
| 7,068,162 B2 | 6/2006 | Maple et al. | |
| 7,350,470 B1 | 4/2008 | Stuhlbarg et al. | |
| 7,400,232 B2 | 7/2008 | Reichling et al. | |
| D580,739 S | 11/2008 | Pelletier et al. | |
| 7,456,725 B2 | 11/2008 | Denison et al. | |
| 7,484,391 B1 | 2/2009 | Moore | |
| 7,516,632 B2 | 4/2009 | Poppell | |
| D593,398 S | 6/2009 | Pelletier et al. | |
| 7,546,920 B1 * | 6/2009 | Horn et al. | 206/317 |
| 8,720,239 B2 * | 5/2014 | Crass et al. | 70/280 |
| 8,869,576 B2 * | 10/2014 | O'Leary et al. | 70/257 |
| 2004/0011097 A1 * | 1/2004 | Jeffers | 70/279.1 |
| 2005/0285716 A1 | 12/2005 | Denison et al. | |
| 2007/0040401 A1 | 2/2007 | Poole | |
| 2007/0210600 A1 | 9/2007 | Young | |
| 2007/0240462 A1 * | 10/2007 | James et al. | 70/159 |
| 2008/0150676 A1 | 6/2008 | Ennis et al. | |
| 2010/0223966 A1 | 9/2010 | Ennis et al. | |

* cited by examiner

TRUCK BOX WITH KEYLESS ENTRY SYSTEM

FIELD OF THE INVENTION

This invention relates to storage boxes for use with vehicles, and, more particularly, to a truck box having a keyless entry system which may be mounted in the bed of a pickup truck.

BACKGROUND OF THE INVENTION

One of the most popular accessories for trucks and recreational vehicles is a truck box used to store and secure a variety of tools and other items. There are a number of different types of storage or truck boxes, including cross-over boxes, side mount boxes, chest boxes, top mount boxes, RV boxes and others. Truck boxes of this type are typically formed of aluminum tread plate, and comprise a front wall, a back wall, a bottom wall and opposed end walls which are interconnected to form a hollow interior. The truck box interior is closed by a top wall or lid pivotal between open and closed positions on a hinge mounted to the back wall, usually with the assistance of gas springs.

In order to secure the lid in the closed position, most truck boxes include a pair of latch elements each mounted to the front wall in position to releasably engage one of a corresponding pair of striker bars carried by the lid. Each latch element has a capture plate which is pivotal between a latched position in which it engages one of the striker bars on the lid, and an unlatched position wherein the striker bar is released to permit the lid to be opened. The capture plates of the latch elements must be moved to the latched and unlatched positions simultaneously, and this is achieved in most truck box designs by one or more operating rods connected between the latch elements. Movement of the operating rod(s) in one direction causes the capture plates to move to the unlatched position, and the operating rod(s) may also function to return the capture plates to a latched position upon movement in the opposite direction. In alternative designs, the capture plates may be returned to a latched position by the operation of one or more return springs or by engagement of the striker plates with the capture plates.

Truck boxes of the type described above typically include one or more locking mechanisms to secure the lid in a closed position on the box. In some designs, a locking mechanism is incorporated in one or both of the latch elements to restrict movement of the capture plate between the latched and unlatched position. Other designs employ one or more locking mechanisms which are separate from the latch elements and act directly on the operating rod(s) to move the latch elements between a latched and unlatched position.

Most locking mechanisms used in truck boxes are locked and unlocked using a key. This is often inconvenient when such boxes are mounted to a pickup truck or other vehicle at a job site, for example, where a number of individuals need access to the contents of the box. Keys may be lost or misplaced, and if only one person has a key to a given box then he or she must be present in order for another to gain access. It is undesirable to leave a truck box unlocked and unattended at a job site with tools or other valuable items inside.

SUMMARY OF THE INVENTION

This invention is directed to a truck box having latch elements, one or more locking mechanisms and a keyless entry system which is operative independently of the locking mechanisms to move the latch elements to an unlatched position in order to permit opening of the lid of the truck box.

In the presently preferred embodiment, first and second paddle latches are mounted to the front wall of a truck box each having a pivot arm with an upper end and a lower end. A first push button lock is mounted to one end wall of the truck box in position to engage a first operating rod which is coupled to the lower end of the pivot arm of each of the paddle latches. A second push button lock is mounted to the opposite end wall of the truck box in position to engage a second operating rod which is coupled to the upper end of the pivot arm of the second paddle latch. Both the first and second push button locks are placed in a locked or unlocked position by operation of a key. When unlocked, each of the push button locks may be operated to move both paddle latches to an unlatched position thus allowing the lid of the truck box to be opened.

The truck box further includes a keyless entry system that is operative independently of the push button locks. The keyless entry system includes a processor unit having a keypad, an actuator coupled to the processor unit, a linkage connected between the actuator and the upper end of the pivot arm of the first paddle latch, and, a power source. When the correct code is entered on the keypad, the processor is operative to cause the actuator to move the pivot arm of the first paddle latch from a latched position to an unlatched position. Since the pivot arms of the first and second paddle latches are connected to one another by the first operating rod, movement of the pivot arm of the first paddle latch in response to operation of the actuator causes the pivot arm of the second paddle latch to also move to an unlatched position. The lid of the truck box may therefore be opened by the keyless entry system of this invention regardless of whether or not the first and/or second push button locks are in a locked or unlocked position.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Referring now to the drawings, the truck box 10 of this invention comprises a front wall 12, a bottom wall 14, opposed end walls 16, 18, a top wall or lid 20 and a back wall 22. Each of the walls 12-22 is preferably formed of aluminum tread plate and are interconnected by welding to form a hollow interior 24. For purposes of illustration and the present discussion, a single lid, cross-over box is depicted in the Figs. but it is contemplated that other types of truck boxes may be employed with the keyless entry system of this invention, discussed below, including side-mount boxes, chest boxes, top mount boxes, trailer boxes, RV boxes and the like.

Figure 1:
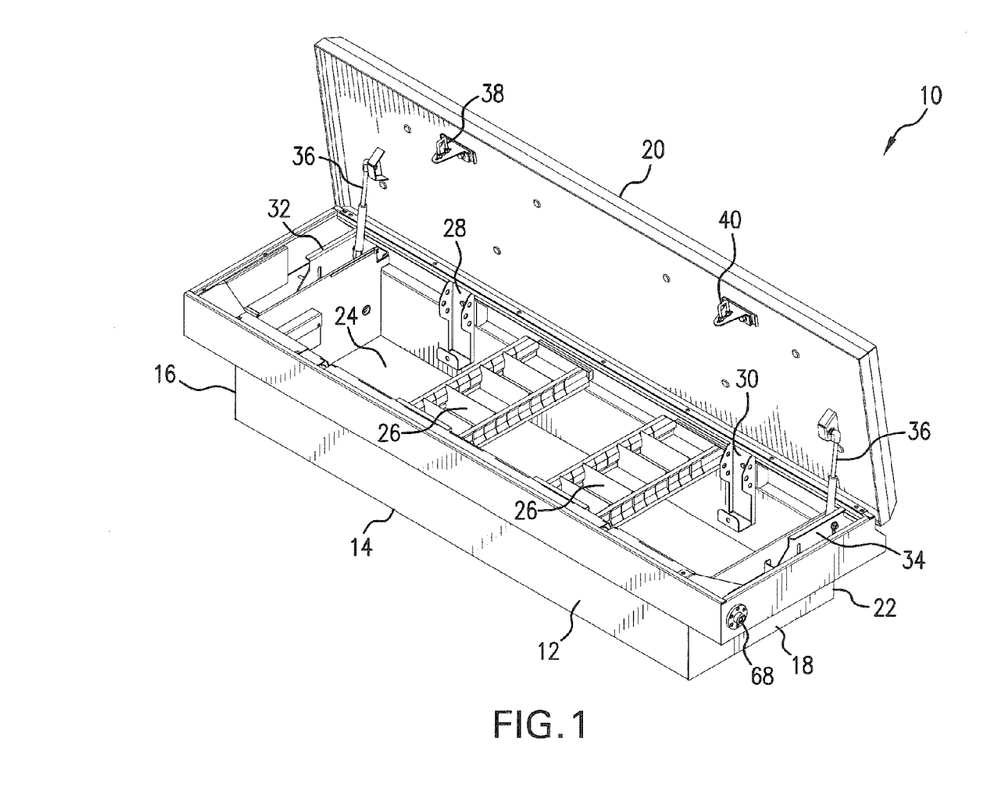
FIG. 1 is a perspective view of a truck box incorporating the keyless entry system of this invention with the lid in an open position.

The interior configuration of the truck box 10 may be varied, as desired, and the components shown in FIG. 1 are for purposes of illustration only. These include one or more trays 26 extending between the front and back walls 12, 22, spaced level mounts 28, 30 connected to the back wall 22 and a pair of plates 32, 34 located near respective end walls 16, 18. Each of the plates 32, 34 supports one end of a gas spring 36 mounted at its opposite end to the lid 20. The lid 20 also mounts a pair of spaced striker bars 38, 40 which are received within paddle latches 42, 44, respectively.

Figure 5:
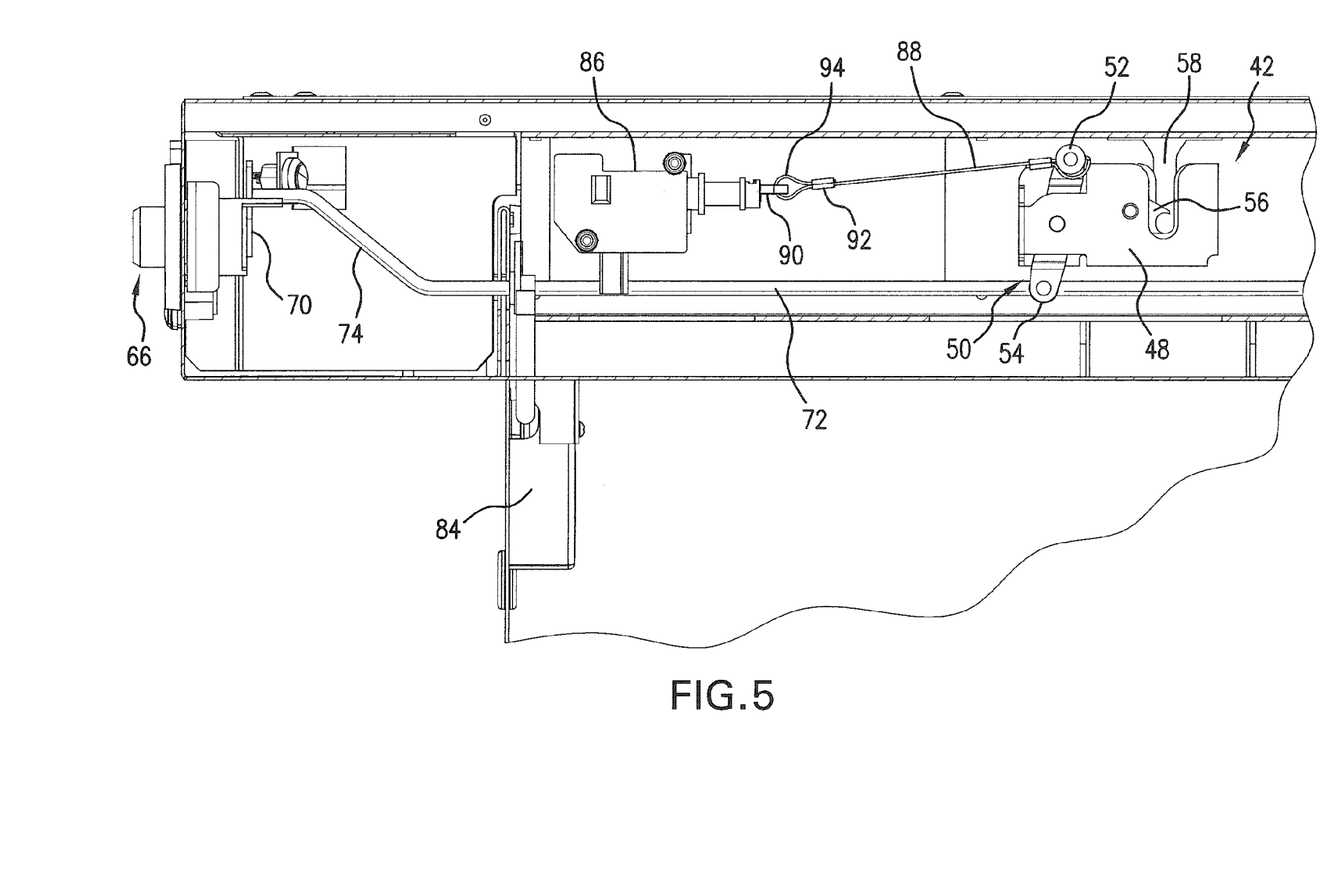
FIG. 5 is an enlarged view of a portion of FIG. 2.
Figure 6:
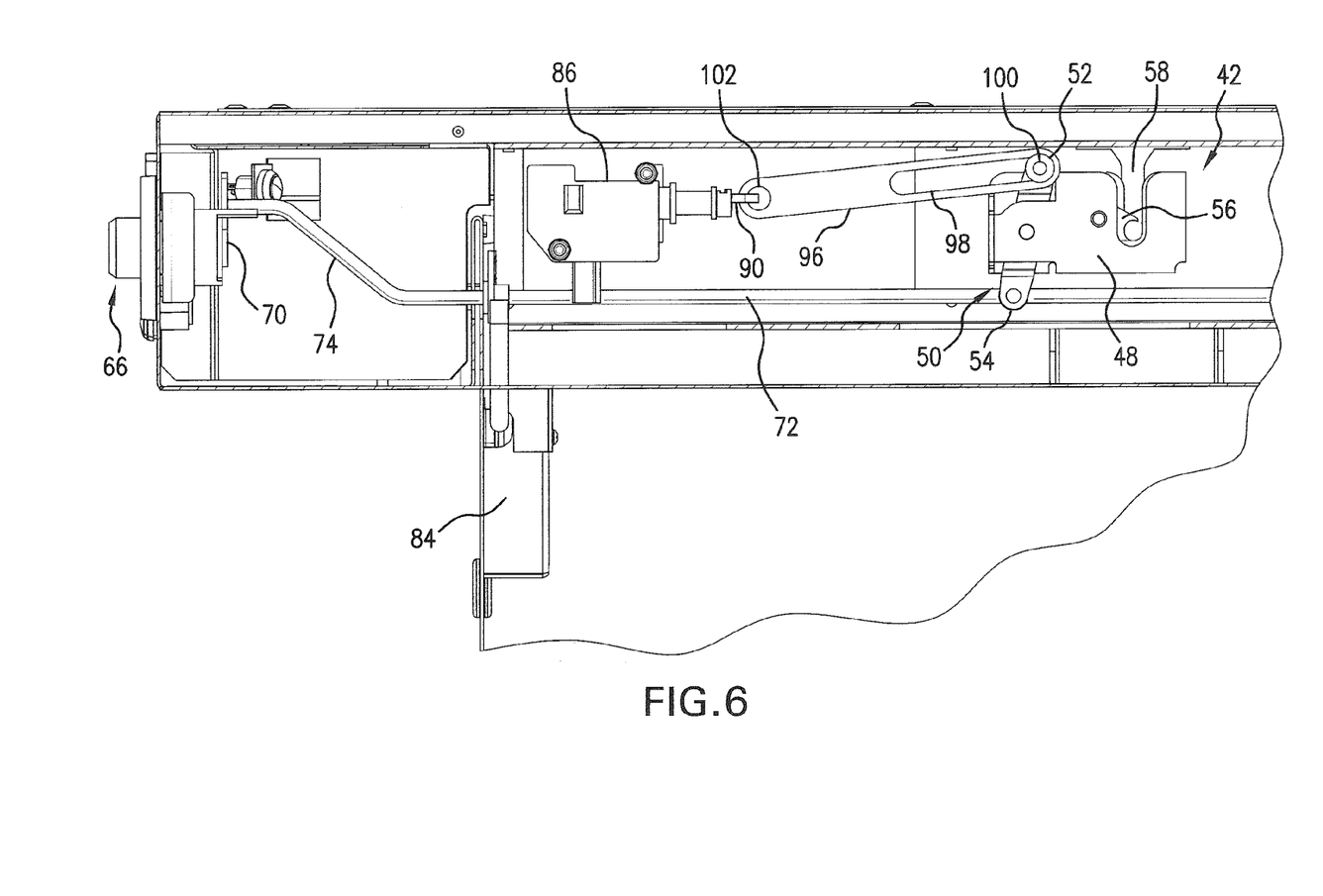
FIG. 6 is a view similar to FIG. 5 except showing an alternative embodiment of a linkage according to this invention.

Referring to FIGS. 2, 3, 5 and 6, the two paddle latches 42 and 44 are mounted on a latch rail 46 which extends along the front wall 12 between the end walls 16, 18 of the truck box 10. The paddle latches 42, 44 are commercially available and the details of same form no part of this invention. For purposes of the present discussion, and as best seen in FIG. 5, each paddle latch 42, 44 includes a latch body 48 which pivotally mounts a pivot arm 50 having an upper end 52 and a lower end 54. The pivot arm 50 is coupled to a capture plate 56 which is moveable between a latched position and an unlatched position relative to a slot 58 formed in the latch body 48 having tapered leading edges. When the lid 20 is closing, the tapered leading edges function to direct the striker bars 38, 40 into the slot 58 of respective paddle latches 42, 44 where they may be engaged by the capture plate 56 to secure the lid 20 in a closed position.

In the presently preferred embodiment, the end wall 16 of the truck box 10 mounts a push button lock 66 and the opposite end wall 18 mounts a second push button lock 68. The push button locks 66, 68 each include a push plate 70 which is moveable between a locked position shown in FIG. 4 and an unlocked position illustrated in FIGS. 2 and 3 wherein the push plate 70 is rotated 90° by operation of a key (not shown). An elongated first operating rod 72 extends along a substantial portion of the front wall 12 of the truck box 10. It includes an upturned end 74 located in alignment with the push plate 70 of the push button lock 66, when in the unlocked position, and an opposite end coupled to the lower end 54 of the pivot arm 50 of paddle latch 44. The first operating rod 72 is also coupled to the lower end 54 of the pivot arm 50 of paddle latch 42. A second operating rod 76 is coupled at one end to the upper end 52 of the pivot arm 50 of paddle latch 44, and its opposite end 78 aligns with the push plate 70 of the push button lock 68 when in the unlocked position.

The push button locks 66, 68, operating rods 72, 76 and paddle latches 42, 44 work in concert to capture or release the striker bars 38, 40 secured to the lid 20. As noted above, when in the unlocked position shown in FIGS. 2 and 3 the push plate 70 of push button lock 66 is in alignment with the upturned end 74 of the first operating rod 72. In response to depressing the push button lock 66, the push plate 70 forces the first operating rod 72 to the right as view in FIG. 3 causing the pivot arm 50 of the paddle latch 42 and the pivot arm 50 of the paddle latch 44 to pivot in a counterclockwise direction. The capture plate 56, in turn, is rotated to an unlatched position so that the striker bars 38, 40 may be received within the slot 58 in the latch body 48, or released, as the case may be. The same counterclockwise motion of the pivot arms 50 is achieved by depressing the push button lock 68. In that case, the push plate 70 of push button lock 68 forces the second operating rod 76 to the left as viewed in FIGS. 2 and 3, which, in turn, pivots the pivot arm 50 of paddle latch 44 in the counterclockwise direction. Since the pivot arms 50 of both paddle latches 42 and 44 are connected to one another by the first operating rod 72, counterclockwise pivotal motion of the pivot arm 50 of paddle latch 44 creates the same motion in the pivot arm 50 of paddle latch 42. The paddle latches 42, 44 may be returned to the latched position by closing the lid 20 wherein the striker bars 38, 40 engage the capture plate 56 of respective paddle latches 42, 44 causing the pivot arms 50 to rotate in a clockwise direction.

The push button locks 66, 68 are locked and unlocked by operation of a key. As discussed above, this arrangement may not be convenient for truck boxes 10 used at job sites or in other applications wherein multiple users must have access to the materials or tools housed in the box 10. This issue is addressed in the subject invention by providing a keyless entry system which is operable independently of the push button locks 66, 68, and regardless of whether such locks 66, 68 are in a locked or unlocked position.

Figure 7:
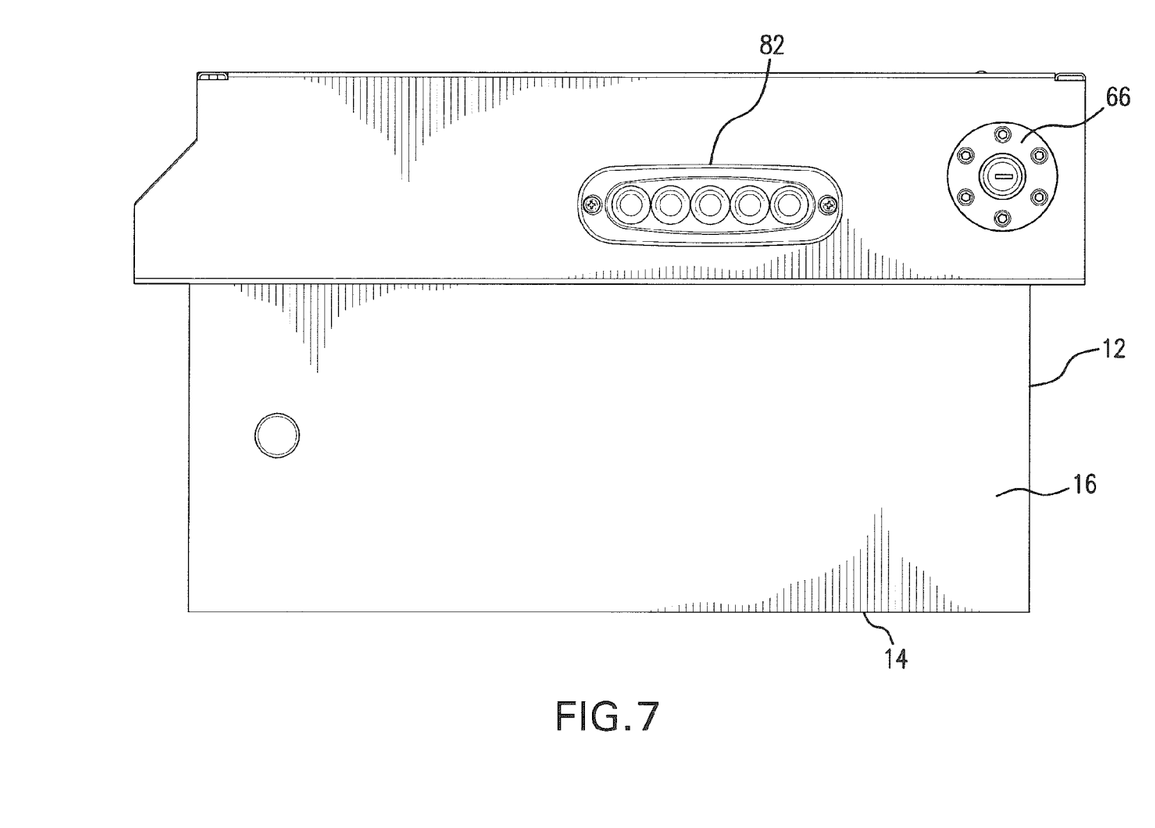
FIG. 7 is a partial side view of the truck box in which the keypad of the keyless entry system is illustrated.

The keyless entry system comprises a keypad 82 which includes a processor (not shown), a power source preferably in the form of a battery pack 84, an actuator 86 and a linkage such as a wire lead 88. See FIGS. 5-7. All of these components are commercially available from TriMark Corporation of New Hampton, Iowa. The battery pack 84, keypad 82 and actuator 86 are preferably hard wired to one another. The actuator 86 includes an adapter 90 formed with an opening in which the wire lead 88 may be inserted and then connected to itself by a cable swage 92 to form a loop 94. The opposite end of the wire lead 88 is coupled to the upper end 52 of the pivot arm 50 of latch body 42. In an alternative embodiment shown in FIG. 6, the wire lead 88 may be replaced by a rod 96 formed with an elongated slot 98. The upper end 52 of pivot arm 50 of paddle latch 42 is connected by a pin 100 to the rod 96 such that the pin 100 is located at one end of the slot 98 and slides therein upon movement of the pivot arm 50 in the counterclockwise direction. The adaptor 90 of the actuator 86 is connected within an opening 102 formed in the opposite end of rod 96.

Figure 2:
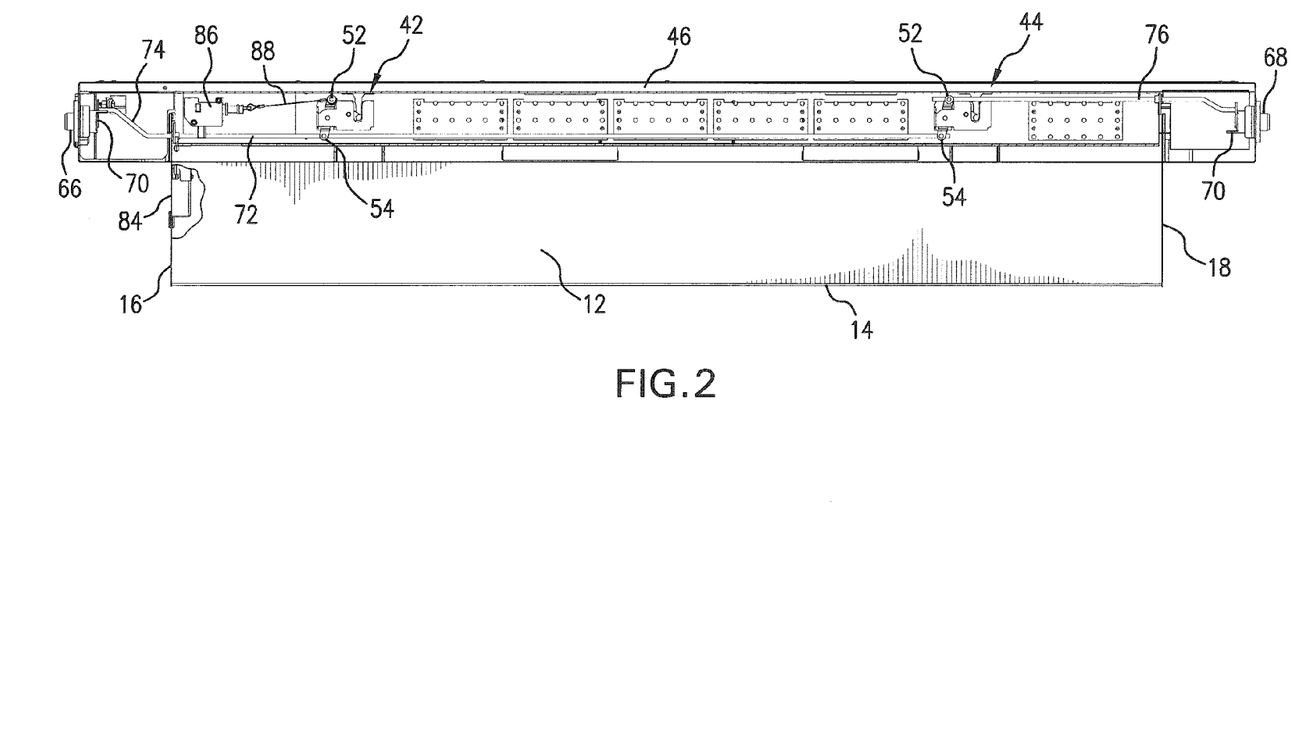
FIG. 2 is a partial cross sectional view of the truck box with a portion of the front wall removed and the paddles latches in a latched position.
Figure 3:
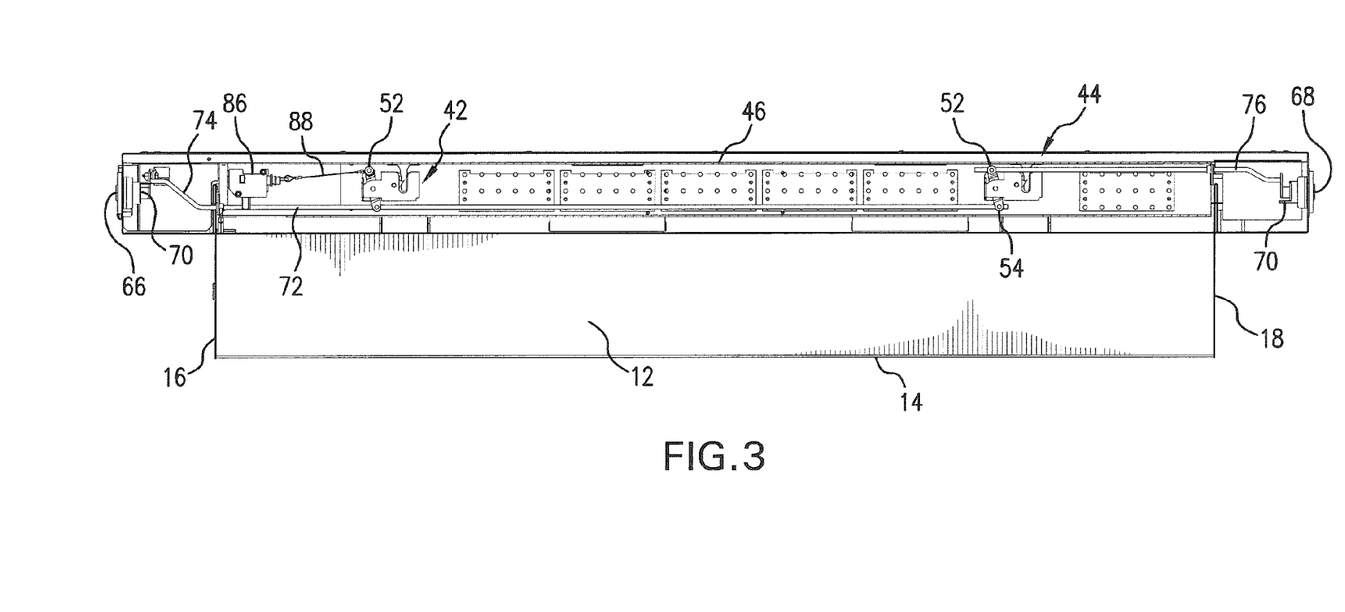
FIG. 3 is a view similar to FIG. 2 except with the paddle latches shown in an unlatched position.
Figure 4:
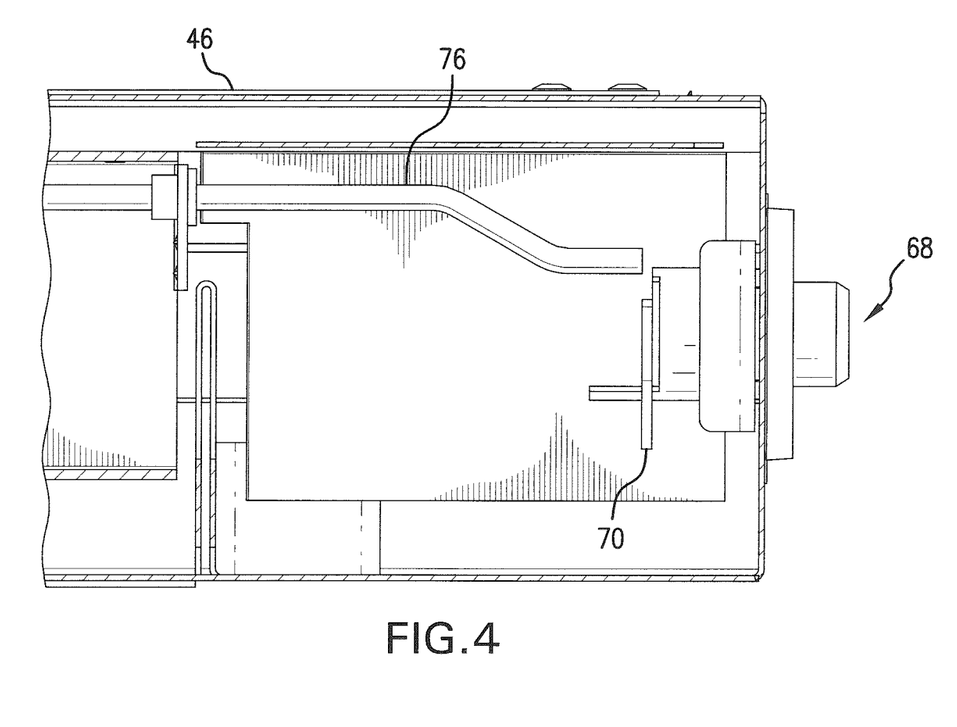
FIG. 4 is a perspective view of one of the push button locks depicted in the locked position.

In response to the entry of the correct code on the keypad 82, the processor signals the actuator 86 to retract its adapter 90 in a direction toward the left as viewed in FIGS. 2, 3 and 5. Because the adapter 90 is connected to the upper end 52 of the pivot arm 50 of paddle latch 42 by the wire lead 88, the pivot arm 50 is pivoted in a counterclockwise direction. Alternatively, if the rod 96 is employed, it pulls the pivot arm 50 in a counterclockwise direction upon operation of the actuator 86 since the pin 100 connecting the rod 96 to the upper end 52 of the pivot arm 50 is located at the end of the elongated slot 98 in the rod 96. The first operating rod 72 is moved to the right with the counterclockwise motion of pivot arm 50 of paddle latch 42. This causes the pivot arm 50 of paddle latch 44 to pivot in the counterclockwise direction since the first operating rod 72 is coupled to the lower end 54 of such pivot arm 50. As discussed above, counterclockwise motion of the pivot arms 50 of paddle latches 42 and 44 causes the capture plates 56 to move to the unlatched position for the receipt or release of the striker bars 38, 40.

It is important to note that operation of the actuator 86 takes place independently of the push button locks 66, 68 and regardless of whether they are in an locked or unlocked condition. Upon operation of the actuator 86 as noted above, the first operating rod 72 is moved to the right as viewed in FIGS. 2 and 3, away from the push button lock 66, whereas the second operating rod 74 is pulled to the left and away from the push button lock 68 as the pivot arm 50 of paddle latch 44 rotates in a counterclockwise direction. On the other hand, when the push button locks 66, 68 are employed to move the paddle latches 42, 44 to an unlatched position, the wire lead 88 which connects the actuator 86 to the pivot arm 50 of paddle latch 42 does not impede counterclockwise movement of the pivot arm 50 of paddle latch 42 because it is flexible and slackens in response to such movement. The rod 96 also does not impede such counterclockwise movement of the pivot arm 50 of paddle latch 42 because the pin 100 connecting the rod 96 to the upper end 52 of pivot arm 50 slides within the elongated slot 98 in a direction to the left as viewed in FIG. 6 when the push button locks 66, 68 are operated.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A storage box, comprising:
   a front wall, a back wall, opposed side walls and opposed end walls interconnected to form a hollow interior, a lid movable between an open position and a closed position relative to said hollow interior, said lid mounting a first striker bar and a second striker bar which are spaced from one another;
   a first latch element mounted to said front wall in substantial alignment with said first striker bar, said first latch element having a first pivot arm which is pivotal between a first position and a second position, said first pivot arm being effective in the course of movement to said first position to place said first latch element in an unlatched position for receiving or releasing said first striker bar, said first pivot arm being movable to said second position in response to engagement of said first striker bar with said first latch element wherein said first latch element is in a latched position for capturing said first striker bar;
   a second latch element mounted to said front wall in substantial alignment with said second striker bar, said second latch element having a second pivot arm which is pivotal between a first position and a second position, said second pivot arm being effective in the course of movement to said first position to place said second latch element in an unlatched position for receiving or releasing said second striker bar, said second pivot arm being movable to said second position in response to engagement of said second striker bar with said second latch element wherein said second latch element is in a latched position for capturing said second striker bar;
   a first operating rod coupled to said first pivot arm of said first latch element and to said second pivot arm of said second latch element, said first operating rod being effective to move said first pivot arm of said first latch element to said first position and said second pivot arm of said second latch element to said first position;
   at least one locking element movable between a locked position and an unlocked position, said at least one locking element being operative when in said unlocked position to cause said first operating rod to pivot each of said first and second pivot arms in the same direction to said first position whereby said first and second latching elements are moved to said unlatched position;
   a keyless entry system, including:
   (i) a processor unit having a keypad;
   (ii) an actuator coupled to said processor unit;
   (iii) a linkage extending between said actuator and said first pivot arm of said first latch element;
   (iv) said processor unit being effective to operate said actuator independently of said at least one locking element in such a way that said linkage pivots said first pivot arm to said first position causing said first operating rod to pivot said second pivot arm in the same direction to said first position whereby said first and second latch elements are moved to said unlatched position.

2. The storage box of claim 1 further including a second operating rod connected to said second pivot arm, said at least one locking element comprising a first locking element and a second locking element each moveable between a locked position and an unlocked position, said second locking element being moveable when in said unlocked position into engagement with said second operating rod in such a way as to cause said second operating rod to pivot said second pivot arm to said first position, said second pivot arm causing said first operating rod to pivot said first pivot arm to said first position.

3. The storage box of claim 1 in which said linkage is a wire rope.

4. The storage box of claim 1 in which said linkage is a rod having an elongated slot, said rod being connected to said first latch element by a pin located within said elongated slot.

5. The storage box of claim 2 in which said actuator and said linkage operate independently of said first and second locking elements and irrespective of whether said first and second locking elements are in a locked position or an unlocked position.

6. A storage box, comprising:
   a front wall, a back wall, opposed side walls and opposed end walls interconnected to form a hollow interior, a lid moveable between an open and closed position relative to said hollow interior, said lid mounting a first striker bar and a second striker bar which are spaced from one another;
   a first latch element mounted to said front wall in substantial alignment with said first striker bar, said first latch element having a first pivot arm movable between a first position and a second position, said first pivot arm being effective in the course of movement to said first position to place said first latch element in an unlatched position for receiving or releasing said first striker bar, said first pivot arm being movable to said second position in response to engagement of said first striker bar with said first latch element wherein said first latch element is in a latched position for capturing said first striker bar;
   a second latch element mounted to said front wall in substantial alignment with said second striker bar, said second latch element having a second pivot arm movable between a first position and a second position, said second pivot arm being effective in the course of movement to said first position to place said second latch element in an unlatched position for receiving or releasing said second striker bar, said second pivot arm being movable to said second position in response to engagement of said second striker bar with said second latch element wherein said second latch element is in a latched position for capturing said second striker bar;
   a first operating rod coupled to said first pivot arm of said first latch element and to said second pivot arm of said second latch element, said first operating rod being effective to move said first pivot arm of said first latch element to said first position and to move said second pivot arm of said second latch element to said first position;

a second operating rod coupled to said second pivot arm of said second latch element, said second operating rod being effective to move said second pivot arm of said second latch element to said first position, said first operating rod coupled to said second pivot arm moving said first pivot arm to said first position in response to movement of said second pivot arm to said first position;

a first locking element and a second locking element each moveable between a locked position and an unlocked position, said first locking element being movable when in said unlocked position into engagement with said first operating rod to which pivots each of said first and second pivot arms in the same direction to said first position wherein respective first and second latch elements are placed in said unlatched position, said second locking element being movable when in said unlocked position into engagement with said second operating rod in such a way as to cause said second pivot arm to pivot to said first position, said second pivot arm causing said first operating rod to pivot said first pivot arm to said first position;

a keyless entry system, including:
(i) a processor unit having a keypad;
(ii) an actuator coupled to said processor unit;
(iii) a linkage extending between said actuator and said first pivot arm of said first latch element;
(iv) said processor unit being effective to operate said actuator independently of said first and second locking elements in such a way that said linkage pivots said first pivot arm to said first position thus causing said first operating rod to pivot said second pivot arm in the same direction to said first position whereby said first and second latch elements are moved to said unlatched position.

7. The storage box of claim 6 in which each of said first and second pivot arms has a first end and a second end, said first operating rod being connected to said second end of each of said first and second pivot arms, said second operating rod being connected to said first end of said second pivot arm, said linkage being connected to said first end of said first pivot arm, each of said first and second pivot arms being pivotable about a point located in between said first and second ends thereof.

8. The storage box of claim 6 in which each of said first and second locking elements includes a push button coupled to a push plate, said push plate of each of said first and second locking elements being positioned out of alignment with one end of respective first and second operating rods when in the locked position, said push plate of each of said first and second locking elements aligning with said one end of respective first and second operating rods when in the unlocked position, said actuator and said linkage being effective to move said first pivot arm of said first latch element to said first position regardless of whether said first and second locking elements are in the locked position or in the unlocked position.

* * * * *